United States Patent
Ryotaro et al.

(10) Patent No.: US 9,548,661 B2
(45) Date of Patent: Jan. 17, 2017

(54) DC-DC CONVERTER AND ELECTRONIC SYSTEM INCLUDING THE SAME

(71) Applicant: SAMSUNG ELECTRONICS CO., LTD., Suwon-si, Gyeonggi-Do (KR)

(72) Inventors: Kudo Ryotaro, Seongnam-si (KR); Gwang Yol Noh, Anyang-si (KR); Hwa Yeal Yu, Bucheon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 83 days.

(21) Appl. No.: 14/687,508

(22) Filed: Apr. 15, 2015

(65) Prior Publication Data

US 2015/0303808 A1    Oct. 22, 2015

(30) Foreign Application Priority Data

Apr. 17, 2014    (KR) .................. 10-2014-0046104

(51) Int. Cl.
*H02M 1/084* (2006.01)
*H02M 3/158* (2006.01)
*H02M 1/00* (2006.01)

(52) U.S. Cl.
CPC ... *H02M 3/1588* (2013.01); *H02M 2001/0009* (2013.01); *H02M 2003/1586* (2013.01); *Y02B 70/1466* (2013.01)

(58) Field of Classification Search
CPC ........ H02M 1/08; H02M 1/082; H02M 1/084; H02M 1/0845; H02M 3/156; H02M 3/157; H02M 3/1584

USPC ............... 323/272, 282, 283, 284, 285, 299
See application file for complete search history.

(56) References Cited

U.S. PATENT DOCUMENTS

| | | | |
|---|---|---|---|
| 7,479,772 B2 | 1/2009 | Zane et al. | |
| 7,710,084 B1 | 5/2010 | Guo | |
| 8,482,271 B2* | 7/2013 | Prodic | H02M 3/1588 323/283 |
| 8,576,583 B2* | 11/2013 | Choi | H02M 3/337 323/283 |
| 2006/0043943 A1* | 3/2006 | Huang | H02M 3/1584 323/222 |
| 2011/0062932 A1 | 3/2011 | Hawkes | |
| 2011/0234188 A1 | 9/2011 | Chiu et al. | |
| 2013/0033248 A1 | 2/2013 | Granger | |
| 2013/0069609 A1 | 3/2013 | Chang | |
| 2013/0069611 A1 | 3/2013 | Menegoli et al. | |
| 2013/0082689 A1 | 4/2013 | Xu et al. | |
| 2014/0266123 A1* | 9/2014 | Rader | H02M 3/156 323/288 |
| 2015/0280544 A1* | 10/2015 | Wang | H02M 1/32 323/285 |

(Continued)

*Primary Examiner* — Jeffrey Sterrett
(74) *Attorney, Agent, or Firm* — Volentine & Whitt, PLLC (57) ABSTRACT

A DC-DC converter is provided. The DC-DC converter includes at least one converter circuit configured to include an inductor and to supply a current to a load through the inductor; and a controller configured to sense the current to generate a sensed signal, to sample and hold the sensed signal at a predetermined sampling time to detect an average current of the inductor, and to control an operation of the at least one converter circuit according to the average current. The sampling time is set to a time in a period while the inductor current is less than a peak and greater than a valley.

19 Claims, 11 Drawing Sheets

(56) References Cited

U.S. PATENT DOCUMENTS

2015/0303808 A1\* 10/2015 Ryotaro .............. H02M 3/1588
            323/271
2015/0340957 A1\* 11/2015 Fang ....................... H02M 1/08
            363/21.16

\* cited by examiner

DC-DC CONVERTER AND ELECTRONIC SYSTEM INCLUDING THE SAME

CROSS-REFERENCE TO RELATED APPLICATIONS

This application claims priority under 35 U.S.C. §119(a) from Korean Patent Application No. 10-2014-0046104 filed on Apr. 17, 2014 the disclosure of which is hereby incorporated by reference in its entirety.

BACKGROUND

Embodiments of the inventive concept relate to a DC-DC converter and an electronic system including the same.

A DC-DC converter is a circuit for changing the magnitude of a DC voltage. The DC-DC converter may be implemented using a buck converter including an inductor. Information about average current flowing in the inductor is needed for phase current balancing and droop control in the DC-DC converter. The average current information may also be used to adjust a switching frequency of a constant-on-time (COT) DC-DC converter.

The average current of the inductor can be obtained from the peak current and the valley current of the inductor. However, this method requires a complex circuit and is disadvantageous in that variation of the inductor value can cause a large error, so that accurately measuring the current is problematic.

SUMMARY

According to some embodiments of the inventive concept, a DC-DC converter comprises at least one converter circuit including an inductor and configured to supply an output current to a load through the inductor; and a controller configured to sense inductor current flowing in the inductor to generate a sensed signal, to sample and hold the sensed signal for a predetermined sampling time to detect average current of the inductor, and to control operation of the at least one converter circuit based on the average current, wherein the sampling time is set to a time within a period during which the inductor current is less than peak current and greater than valley current.

According to other embodiments of the inventive concept, an electronic system comprises a DC-DC converter configured to convert an input voltage into an output voltage; and an electronic device configured to operate based on the output voltage, wherein the DC-DC converter comprises at least one converter circuit that includes an inductor and is configured to supply an output current to the electronic device through the inductor; and a controller configured to sense inductor current flowing in the inductor and to generate a sensed signal, to sample and hold the sensed signal at a predetermined sampling time to detect average current of the inductor, and to control operation of the at least one converter circuit based on the average current, wherein the sampling time is set to a time within a period in which the inductor current is less than peak current and greater than valley current.

According to further embodiments of the inventive concept, a method of operating a DC-DC converter that comprises at least one buck converter circuit that includes an inductor and supplies current to a load through the inductor, comprises sensing the current and generating a sensed signal; and sampling and holding the sensed signal at a predetermined sampling time and detecting an average current of the inductor, wherein the current at the predetermined sampling time has a value between peak current and valley current.

Other features may optionally be included within the various embodiments. For example:

The controller may operate the at least one converter circuit based on switching frequency and the switching frequency may be determined based on input voltage of the DC-DC converter, an output voltage put across the load, and the output current.

The at least one converter circuit may include a first buck converter circuit comprising a first inductor; a second buck converter circuit comprising a second inductor; and a third buck converter circuit comprising a third inductor, such that inductor currents flowing in the first through third inductors have a respective phase interval between one another of 120 degrees.

The sampling time may be substantially halfway between a first time at which the inductor current is at the valley current and a second time at which the inductor current is at the peak current.

The controller may include a current sensor configured to sense the inductor current to generate the sensed signal; a timer circuit configured to generate a converter control signal for controlling the operation of the converter circuit and a sampling signal for sampling the sensed signal at the sampling time; and a sample-and-hold circuit configured to sample and hold the sensed signal based on the sampling signal.

The timer circuit may be implemented as a digital circuit comprising a counter.

The timer circuit may include a converter control signal generator configured to compare ramp voltage with a first reference voltage and to generate the converter control signal; a voltage divider configured to generate a second reference voltage proportional to the first reference voltage; and a sampling signal generator configured to compare the ramp voltage with the second reference voltage and to generate the sampling signal.

The controller may adjust switching frequency of the at least one converter circuit based on the average current of the inductor.

The controller may control magnitude of droop current based on the average current of the inductor.

The controller may perform current sharing based on the average current of the inductor.

BRIEF DESCRIPTION OF THE DRAWINGS

The above and other features and advantages of the inventive concept will become more apparent by describing in detail exemplary embodiments thereof with reference to the attached drawings in which.

DETAILED DESCRIPTION OF THE EMBODIMENTS

The inventive concept now will be described more fully hereinafter with reference to the accompanying drawings, in which embodiments of the inventive concept are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any individual one and all combinations of one or more of the associated listed items and may be abbreviated as "/".

It will be understood that, although the terms first, second, etc. may be used herein to describe various elements, these elements should not be limited by these terms. These terms are only used to as labels distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the inventive concept. As used herein, the singular forms "a", "an", and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
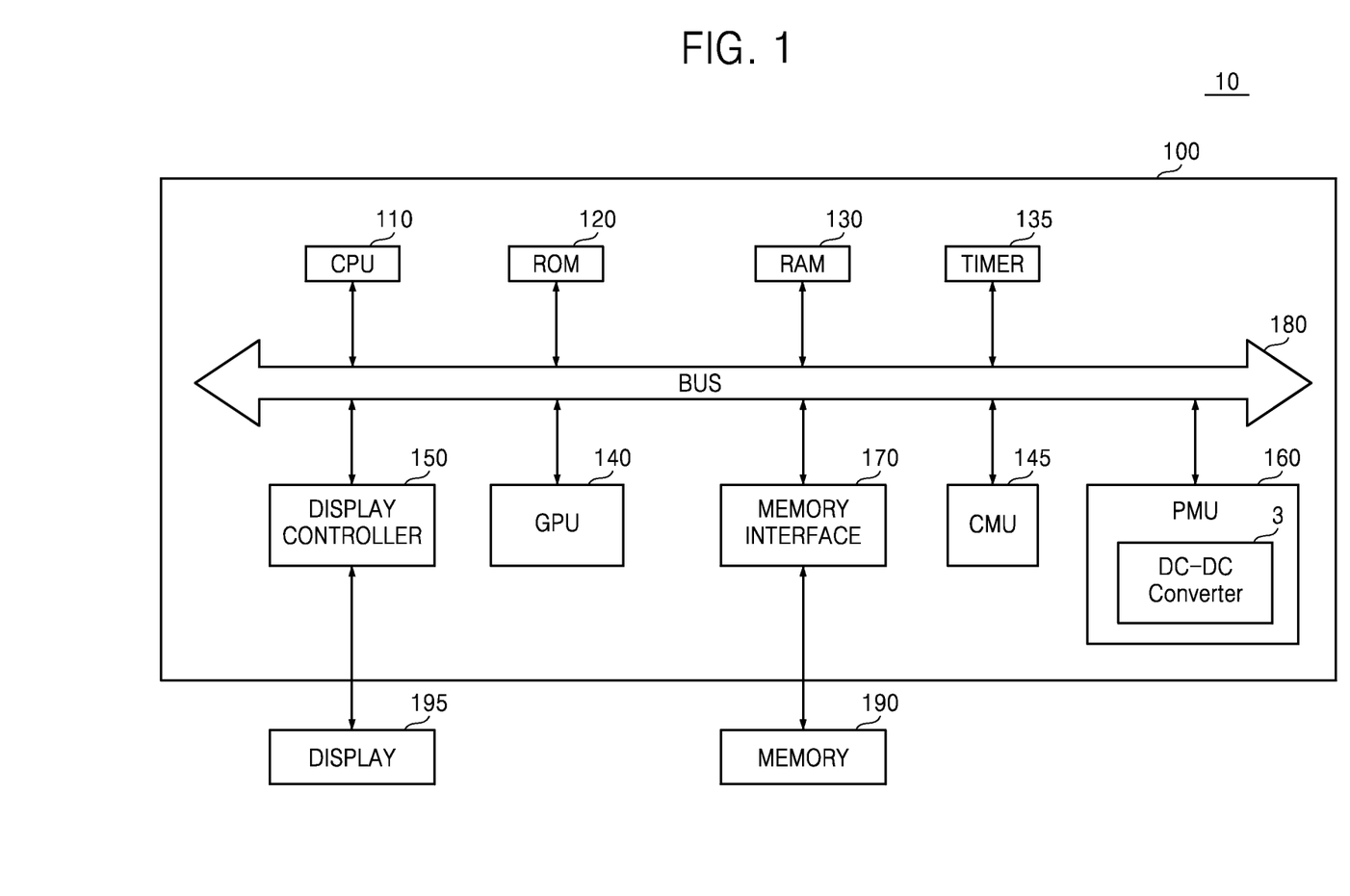
FIG. 1 is a block diagram of an electronic system according to some embodiments of the inventive concept.

FIG. 1 is a block diagram of an electronic system 10 according to some possible embodiments of the inventive concept. The electronic system 10 may be implemented as a handheld device such as a cellular telephone, a smart phone, a tablet computer, a personal digital assistant (PDA), an enterprise digital assistant (EDA), a digital still camera, a digital video camera, a portable multimedia player (PMP), a personal navigation device or portable navigation device (PND), a handheld game console, or an e-book, or other device. The electronic system 10 may include a system-on-chip (SoC) 100, a memory device 190, and a display device 195.

The SoC 100 may include a central processing unit (CPU) 110, a read-only memory (ROM) 120, a random access memory (RAM) 130, a timer 135, a graphics processing unit (GPU) 140, a clock management unit (CMU) 145, a display controller 150, a memory interface 170, and a bus 180. The SoC 100 may also include other elements. The electronic system 10 may also include a power management unit (PMU) 160. The PMU 160 is implemented inside the SoC 100 in the embodiments illustrated in FIG. 1, but the PMU 160 may be implemented outside the SoC 100 in other embodiments.

The PMU 160 may include a DC-DC converter 3. The DC-DC converter 3 may be a circuit for changing the magnitude of a DC voltage. For instance, the DC-DC converter 3 may convert an input voltage (VIN in FIG. 3) into an output voltage (VOUT in FIG. 3) and the PMU 160 may operate according to the output voltage. Hereinafter, embodiments in which the DC-DC converter 3 is included in the PMU 160 of the SoC 100 will be described, but the inventive concept is not restricted to these embodiments. The DC-DC converter 3 may be included in another element, e.g., the CPU 110, apart from the SoC 100, or in other embodiments it may be included in another electronic system apart from the electronic system 10 illustrated in FIG. 1.

The CPU 110, which may be referred to as a processor, may process or execute programs and/or data stored in the memory device 190. For instance, the CPU 110 may process or execute the programs and/or the data in response to a clock signal output from a clock signal generator (not shown). The CPU 110 may be implemented as a multi-core processor. The multi-core processor is a single computing component with two or more independent actual processors (referred to as cores). Each of the processors reads and executes program instructions. Since the multi-core processor can drive a plurality of accelerators at a time, a data processing system including the multi-core processor can perform multi-acceleration.

The programs and/or the data stored in the ROM 120, the RAM 130, and the memory device 190 may be loaded to memory in the CPU 110 when necessary. The ROM 120 may store permanent programs and/or data. The ROM 120 may be implemented as erasable programmable ROM (EPROM) or electrically erasable programmable ROM (EEPROM).

The RAM 130 may temporarily store programs, data, or instructions. The programs and/or data stored in the memory 120 or 190 may be temporarily stored in the RAM 130 according to the control of the CPU 100 or a booting code stored in the ROM 120. The RAM 130 may be implemented as dynamic RAM (DRAM) or static RAM (SRAM).

The GPU 140 may process data read by the memory controller 170 from the memory device 190 into a signal suitable to be displayed.

The CMU 145 generates an operating clock signal and may control the output of the operating clock signal. The CMU 145 may include a clock signal generator such as a phase locked loop (PLL), a delay locked loop (DLL), or a crystal oscillator and a clock generator. The CMU 145 may provide the operating clock signal for the elements 110 through 170.

The memory interface 170 interfaces with the memory device 190. The memory interface 170 controls the overall operation of the memory device 190 and controls overall data exchange between a host and the memory device 190. For instance, the memory interface 170 may write data to the memory device 190 or read data from the memory device 190 at the request of the host. Here, the host may be a processing unit such as the CPU 110, the GPU 140, or the display controller 150.

The memory device 190 is a storage medium for storing data and it may store an operating system (OS) and various kinds of programs and data. The memory device 190 may be DRAM, but the inventive concept is not restricted to the current embodiments. For instance, the memory device 190 may be non-volatile memory such as flash memory, phase-change RAM (PRAM), magnetoresistive RAM (MRAM), resistive RAM (ReRAM) or ferroelectric RAM (FeRAM). In other embodiments, the memory device 190 may be an embedded memory provided within the SoC 100. The elements 110, 120, 130, 140, 150, 160, and 170 may communicate with one another through the bus 180.

The display device 195 may generate a display synchronization signal and may display an image signals output from the display controller 150 according to the display synchronization signal. The display synchronization signal may be a vertical synchronization signal. The display device 195 may be implemented as a liquid crystal display (LCD) device, a light emitting diode (LED) display device, an organic LED (OLED) display device, or an active-matrix OLED (AMOLED) display device. The display controller 150 controls the operation of the display device 195.

Figure 2:
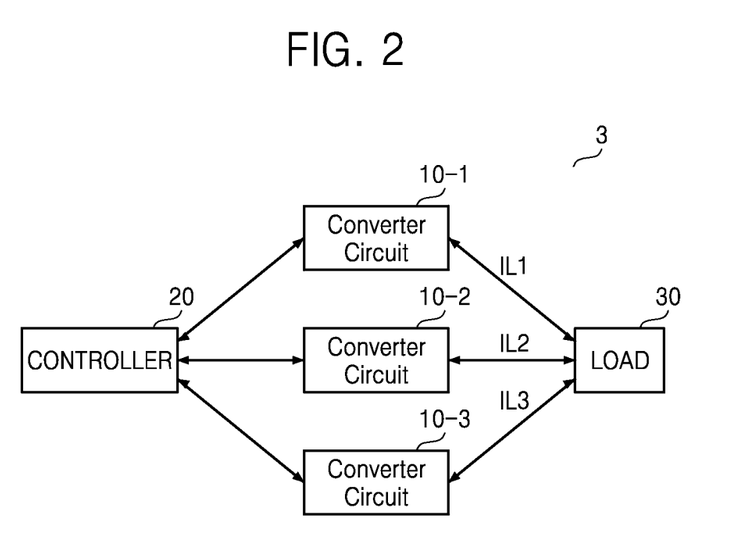
FIG. 2 is a block diagram of an exemplary DC-DC converter for the system of FIG. 1.

FIG. 2 is a block diagram of the DC-DC converter 3 illustrated in FIG. 1. Referring to FIG. 2, the DC-DC converter 3 may be implemented as a multi-phase DC-DC converter including a plurality of converter circuits 10-1, 10-2, and 10-3, a controller 20, and a load 30. The converter circuits 10-1, 10-2, and 10-3 may change the magnitude of a DC voltage according to the control of the controller 20. The converter circuits 10-1, 10-2, and 10-3 may be implemented using a buck converter, a boost converter, or a buck-boost converter.

The converter circuits 10-1, 10-2, and 10-3 may include an inductor (not shown) and provide inductor currents IL1, IL2, and IL3, respectively, to the load 30 through their inductors. The inductor currents IL1, IL2, and IL3 may have a phase interval of 120 degrees. Accordingly, a constant DC voltage may be put across the load 30.

The controller 20 may detect the inductor currents IL1, IL2, and IL3; may detect average current of the inductor in each of the converter circuits 10-1, 10-2, and 10-3; and may control the operation of each converter circuit 10-1, 10-2, or 10-3 based on the average current. The controller 20 may control the converter circuits 10-1, 10-2, and 10-3 so that the converter circuits 10-1, 10-2, and 10-3 operate in constant-on-time (COT) mode.

Figure 3:
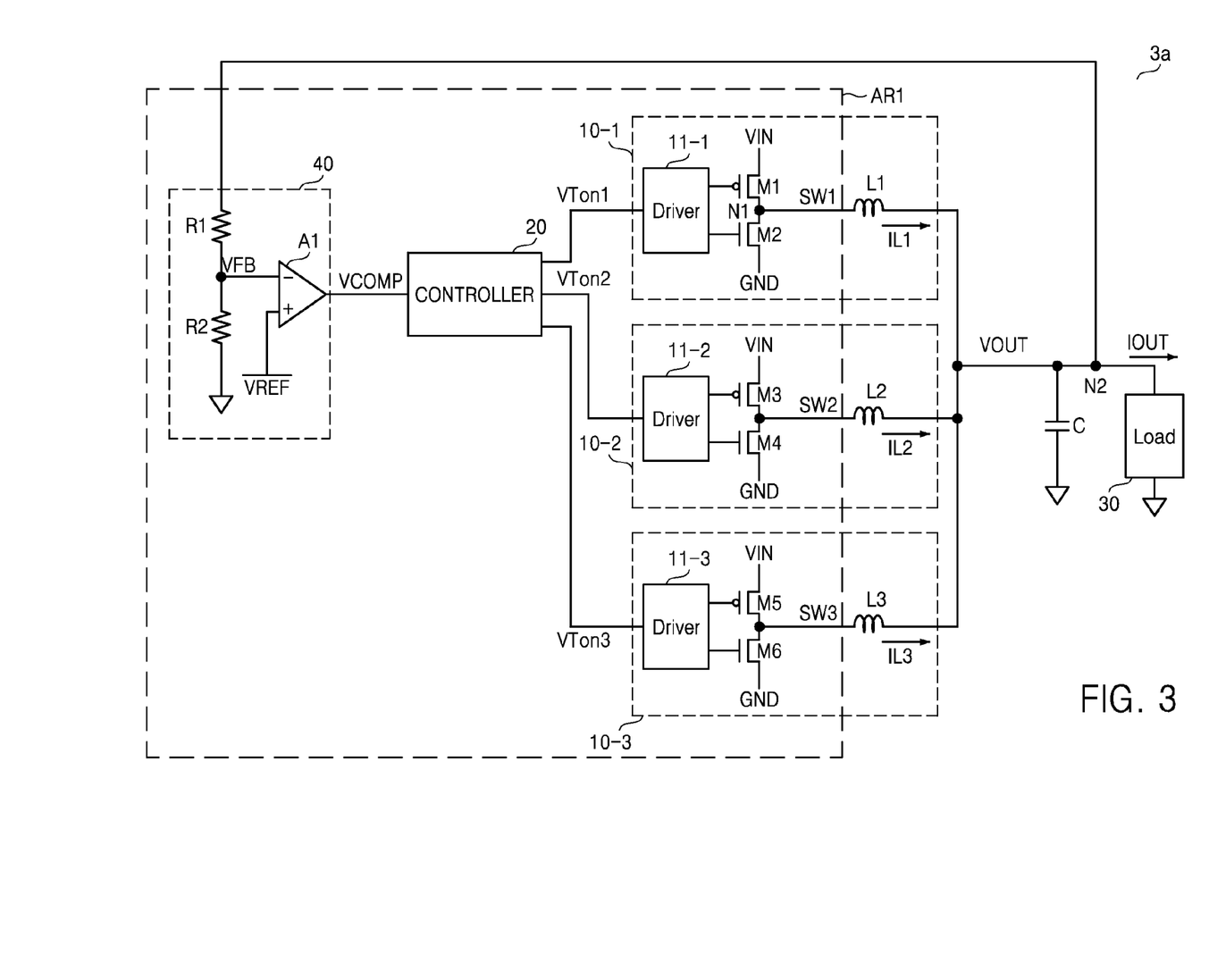
FIG. 3 is a circuit diagram of an example of the DC-DC converter illustrated in FIG. 2.

FIG. 3 is a circuit diagram of an example 3a of the DC-DC converter 3 illustrated in FIG. 2. Referring to FIG. 3, the DC-DC converter 3 may include three converter circuits 10-1, 10-2, and 10-3, the controller 20, the load 30, a capacitor C, and a feedback circuit 40.

A converter circuit, e.g., 10-1, may include a driver 11-1, a first transistor M1, a second transistor M2, and an inductor L1.

The driver 11-1 may receive a converter control signal VTon1 from the controller 20. The driver 11-1 may control the operations of the first and second transistors M1 and M2 according to the converter control signal VTon1.

The first transistor M1 may be connected between a first power line for supplying the input voltage VIN and a first node N1 and may have a gate connected to the driver 11-1. The second transistor M2 may be connected between a second power line for supplying a ground voltage GND and the first node N1 and may have a gate connected to the driver 11-1. The first and second transistors M1 and M2 may be selectively conducted according to the control of the driver 11-1.

The inductor L1 may be connected between the first node N1 and a second node N2 to transmit the first inductor current IL1 to the load 30. The controller 20 may detect the first inductor current IL1 and may control the converter control signal VTon1 based on the detection result. The structure of the controller 20 will be described below in detail with reference to FIG. 4.

The capacitor C may be connected to the load 30 in parallel in order to prevent the ripple of the output voltage VOUT put across the load 30. The feedback circuit 40 may be connected between the second node N2 and the controller 20. The feedback circuit 40 may include a first resistor R1, a second resistor R2, and a first comparator A1.

The first resistor R1 may be connected between the second node N2 and an inverting input terminal, i.e., a negative input terminal of the first comparator A1. A first end of the second resistor R2 may be connected to the inverting input terminal of the first comparator A1 and the ground voltage GND may be applied to a second end of the second resistor R2.

A feedback voltage VFB may be put across the inverting input terminal of the first comparator A1. The magnitude of the feedback voltage VFB may be determined according to the resistance of the first and second resistors R1 and R2. The first comparator A1 may compare the feedback voltage VFB with a feedback reference voltage VREF and may generate and output a comparison voltage VCOMP to the controller 20 according to the comparison result.

The controller 20 may control the output voltage VOUT and the first inductor current IL1 by controlling the converter control signal VTon1 according to the comparison voltage VCOMP.

In some embodiments, a die area AR1 including the controller 20, the feedback circuit 40, and the converter circuits 10-1, 10-2, and 10-3 except for the inductors L1, L2, and L3, may be implemented on a silicon die.

Figure 4:
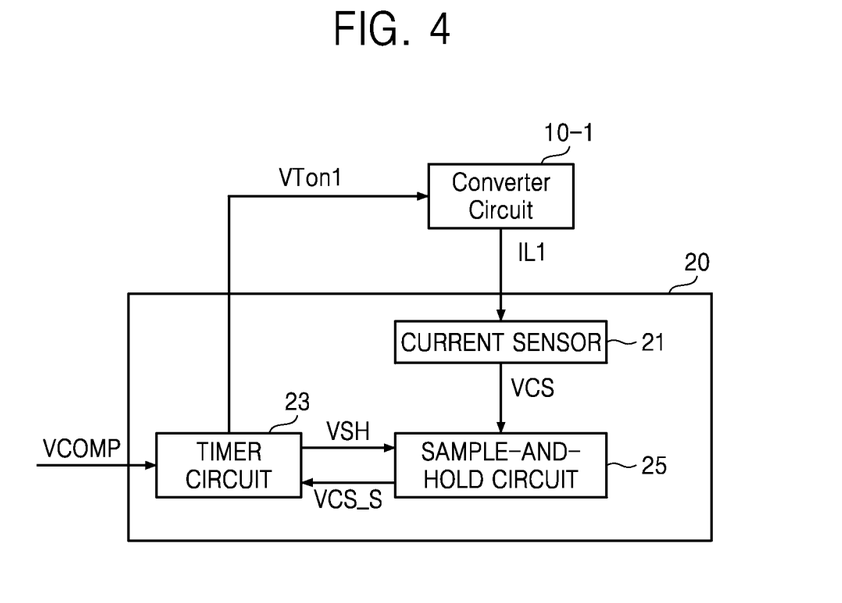
FIG. 4 is a detailed block diagram of an exemplary controller such as the one illustrated in FIG. 3.

FIG. 4 is a detailed block diagram of the controller 20 illustrated in FIG. 3. Referring to FIGS. 3 and 4, the controller 20 may include a current sensor 21, a timer circuit 23, and a sample-and-hold circuit 25. The operation of the controller 20 on the first converter circuit 10-1 will be described with reference to FIG. 4. The controller 20 may operate with respect to the second and third converter circuits 10-2 and 10-3 in the same manner as with respect to the first converter circuit 10-1.

The current sensor 21 may sense the inductor current IL1$d$ of the converter circuit 10-1 and generate a sensed signal VCS. The sensed signal VCS may be a voltage signal.

The timer circuit 23 may generate the converter control signal VTon1 for controlling the operation of the first converter circuit 10-1 and a sampling signal VSH for sampling the sensed signal VCS at a predetermined sampling time. The sample-and-hold circuit 25 may generate a sampled sensed signal VCS_S by performing sample-and-hold on the sensed signal VCS according to the sampling signal VSH. The sampled sensed signal VCS_S may indicate inductor average current information of the converter circuit 10-1.

The timer circuit 23 may control the operation of the first converter circuit 10-1 based on the sampled sensed signal VCS_S. The timer circuit 23 may receive the comparison voltage VCOMP from the feedback circuit 40 and may control the converter control signal VTon1 based on the sampled sensed signal VCS_S and the comparison voltage VCOMP.

Figure 5:
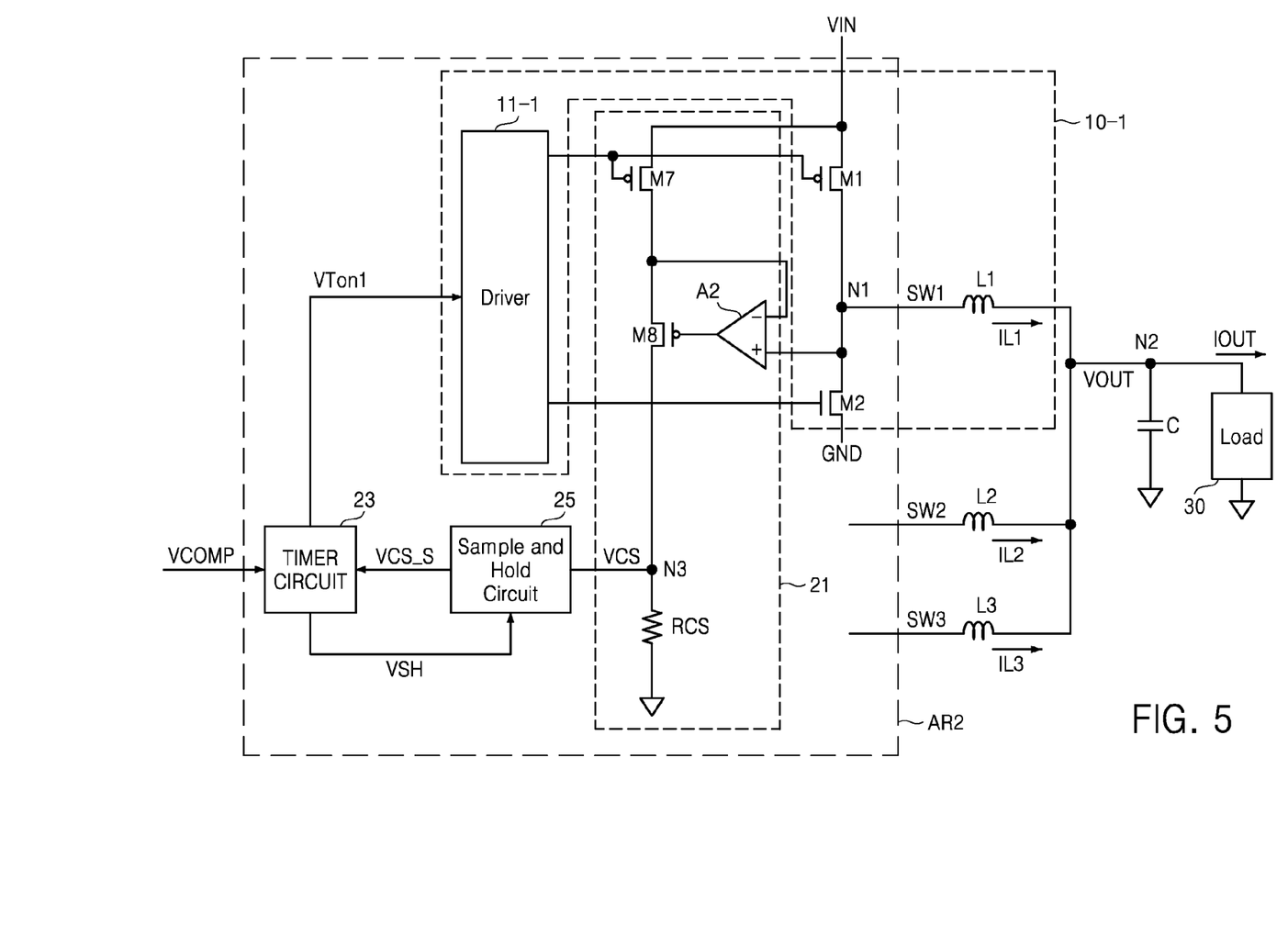
FIG. 5 is a detailed circuit diagram of a part of the DC-DC converter illustrated in FIG. 3.

FIG. 5 is a detailed circuit diagram of a part of the DC-DC converter 3a illustrated in FIG. 3. The structure outside the first converter circuit 10-1 and outside the die area AR1 is the same as that illustrated in FIG. 3, so only differences between the structure illustrated in FIG. 3 and the structure illustrated in FIG. 5 will be described in detail here.

Referring to FIG. 5, the current sensor 21 may include a seventh transistor M7, an eighth transistor M8, a second comparator A2, and a sensing resistor RCS. The seventh transistor M7 may be connected between the first power line and an inverting input terminal of the second comparator A2 and may have a gate connected to a gate of the first transistor M1. The eighth transistor M8 may be connected between a third node N3 and the inverting input terminal of the second comparator A2 and may have a gate connected to an output terminal of the second comparator A2.

The current sensor 21 may sense the first inductor current IL1 occurring when the first transistor M1 is conducting current and the second transistor M2 is not conducting current, and generate the sensed signal VCS. At this time, the first inductor current IL1 is equal to the current flowing in the first transistor M1. In other embodiments, the current sensor 21 may be configured to sense the first inductor current IL1 when the first transistor M1 is not conducting current and the second transistor M2 is conducting current.

When an area ratio between the seventh transistor M7 and the first transistor M1 is M:N, a current M/N times the current flowing in the first transistor M1 flows in the seventh transistor M7. The sensed voltage VCS at the third node N3 may be obtained using Equation 1:

$$VCS = IL1 * M/N * RCS. \quad (1)$$

The timer circuit 23 may generate the converter control signal VTon1 for controlling the operation of the first converter circuit 10-1 and the sampling signal VSH for sampling the sensed signal VCS at a predetermined sampling time. The sample-and-hold circuit 25 may sample and hold the sensed voltage VCS based on the sampling signal VSH, and generate the sampled sensed signal VCS_S. The sampled sensed signal VCS_S may indicate the average current information of the inductor L1. The timer circuit 23 may control the converter control signal VTon1 based on the sampled sensed signal VCS_S and the comparison voltage VCOMP, and output the controlled converter control signal VTon1 to the driver 11-1.

Figure 6:
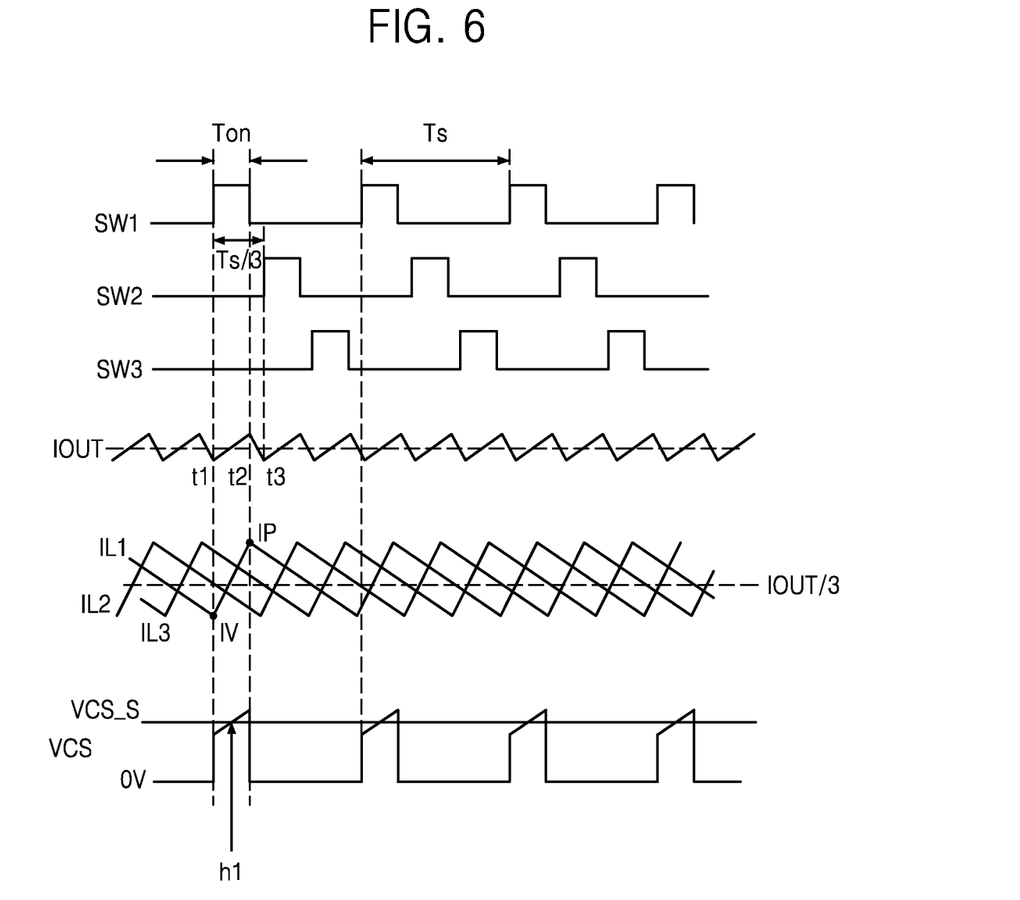
FIG. 6 is a timing chart of signals of the circuit illustrated in FIG. 5.

FIG. 6 is a timing chart of signals of the circuit illustrated in FIG. 5. Referring to FIGS. 5 and 6, a first switching voltage SW1 may be applied to the first node N1 of the first converter circuit 10-1 in a predetermined period Ts and may be maintained at a high level (e.g., VIN) during a conduction time Ton in the period Ts. The conduction time Ton may be less than Ts/3. The first switching voltage SW1 may transit from a low level (e.g., GND) to Valley the high level at a first time t1 and may transit from the high level to the low level at a second time t2.

A second switching voltage SW2 of the second converter circuit 10-2 may transit from the low level to the high level at a third time t3, i.e., after Ts/3 elapses from the first time t1. The first through third switching voltages SW1, SW2, and SW3 are illustrated in FIG. 6 as having a phase difference from one another of 120 degrees.

The first inductor current IL1 may increase from a valley IV to a peak IP while the first switching voltage SW1 is at its high level and may decrease from the peak IP to the valley IV while the first switching voltage SW1 is at its low level. The peak IP current occurs when the slope of the first inductor current IL1 changes from a positive value to a negative value. The valley current IV occurs when the slope of the first inductor current IL1 changes from a negative value to a positive value. The valley IV and peak IP currents are thus minimum and maximum values, respectively, of the first inductor current IL1.

An output current IOUT of the load 30 in the embodiment illustrated in FIG. 6 is the sum of the first through third inductor currents IL1, IL2, and IL3. The output current IOUT may be output in a period of Ts/3. It may increase from the first time t1 to the second time t2 and then decrease from the second time t2 to the third time t3.

The sensed voltage VCS is generated by sensing the first inductor current IL1 during the conduction time Ton. Accordingly, the sensed voltage VCS may have a value proportional to the first inductor current IL1 during the conduction time Ton in the period Ts and may have a value of 0 V during other times.

The sample-and-hold circuit 25 may sample and hold the sensed voltage VCS at a predetermined sampling time h1 to generate the sampled sensed signal VCS_S. The sampling time h1 may be set to a time when the first inductor current IL1 has a value between the peak IP and the valley IV. For example, as can be seen in FIG. 6, the sampling time h1 can be halfway between time t1 when the first inductor current IL1 is at the valley current IV, and time t2 when the first inductor current IL1 is at the peak current IP. In other words, the difference between the first time t1 and the sampling time h1 may be the same as the difference between the sampling time h1 and the second time t2. At the sampling time h1 the first inductor current IL1 may thus be at an average value between the peak IP and the valley IV currents. Due to the half-time sampling, the sampled sensed signal VCS_S may indicate the average current for the inductor L1.

Figure 7:
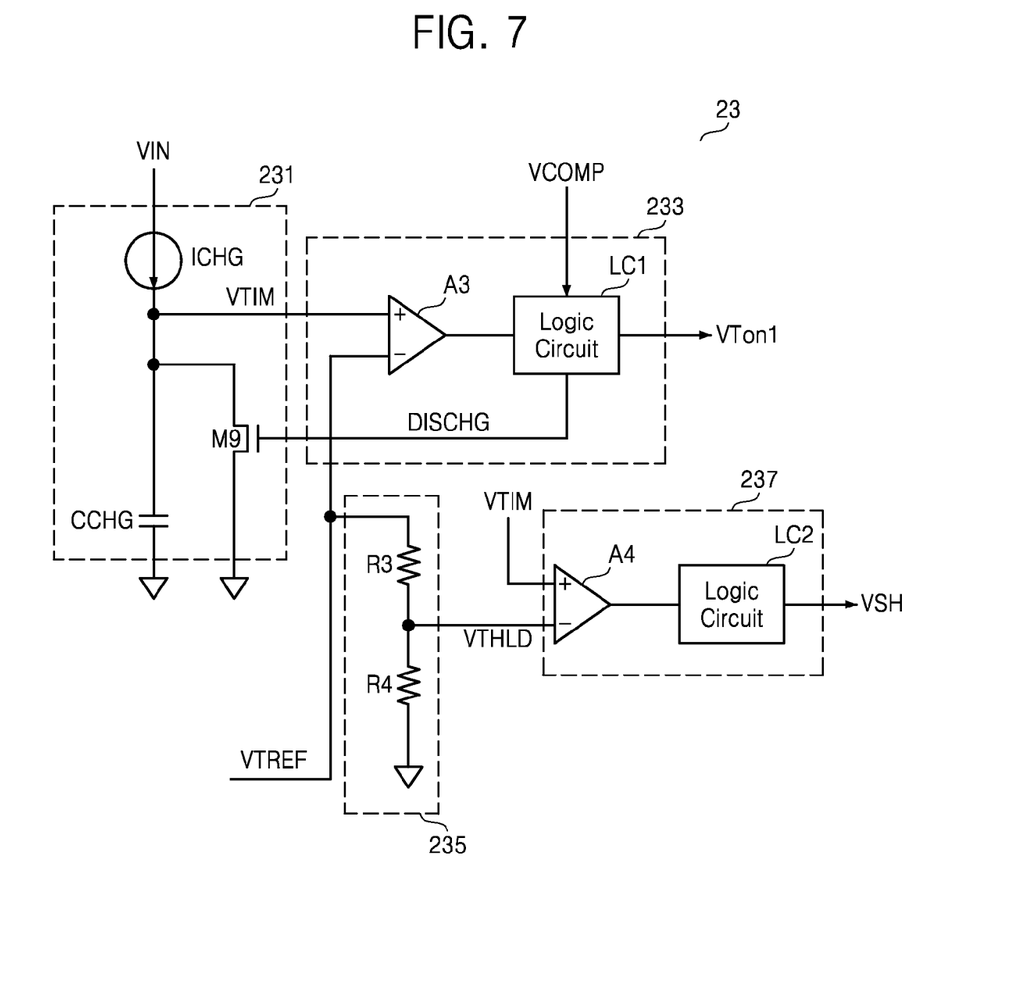
FIG. 7 is a circuit diagram of an exemplary timer circuit such as the one illustrated in FIG. 5.
Figure 8:
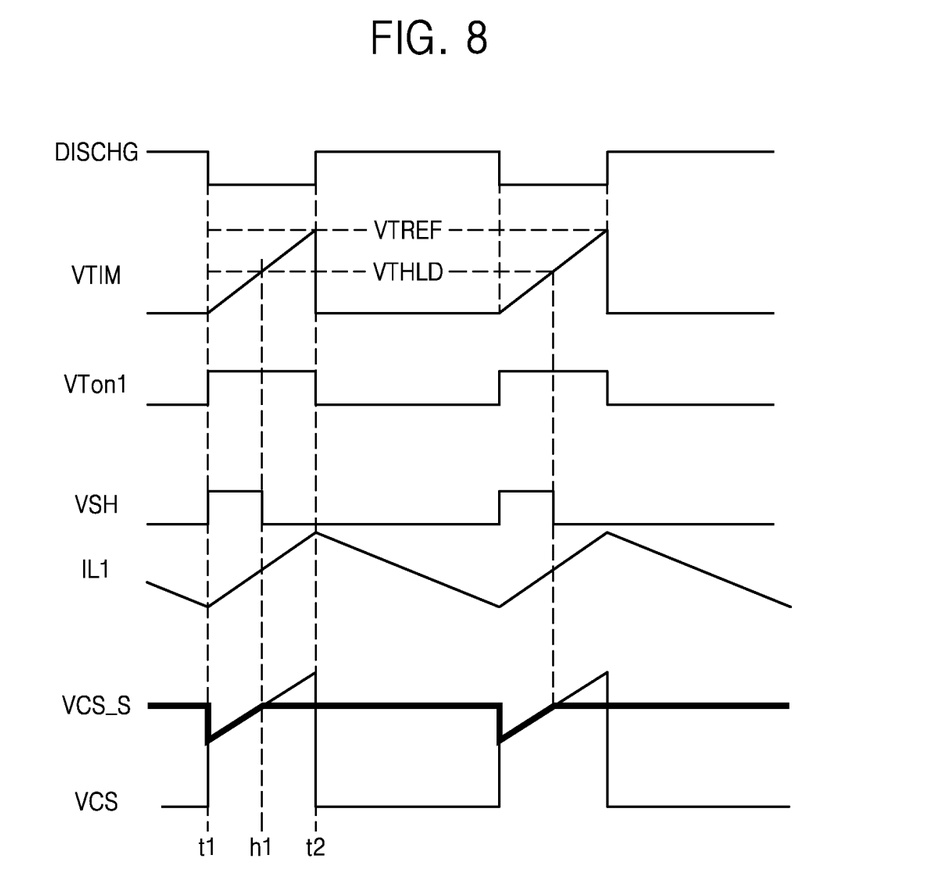
FIG. 8 is a timing chart of signals of the timer circuit illustrated in FIG. 7.

FIG. 7 is a circuit diagram of the timer circuit 23 illustrated in FIG. 5. FIG. 8 is a timing chart of signals of the circuit illustrated in the FIG. 7. Referring to FIGS. 3, 7, and 8, the timer circuit 23 may include a ramp voltage generator 231, a converter control signal generator 233, a voltage divider 235, and a sampling signal generator 237.

The ramp voltage generator 231 may include a current source ICHG, a charge capacitor CCHG connected to the current source ICHG, and a ninth transistor M9 connected in parallel to the charge capacitor CCHG. The ninth transistor M9 may operate like a switch according to a discharge signal DISCHG. A ramp voltage VTIM increases at a constant rate while the ninth transistor M9 is not conducting current. When the ninth transistor M9 is conducting current, the charge capacitor CCHG is discharged, decreasing the ramp voltage VTIM to the ground voltage GND.

The converter control signal generator 233 may include a third comparator A3 and a first logic circuit LC1, with the third comparator A3 comparing the ramp voltage VTIM with a predetermined first reference voltage VTREF and outputting a comparison result to the first logic circuit LC1.

The first logic circuit LC1 may generate and output the discharge signal DISCHG to a gate of the ninth transistor M9. The first logic circuit LC1 may receive the comparison voltage VCOMP from the feedback circuit 40. The first logic circuit LC1 may generate the converter control signal VTon1 based on the comparison result output from the third comparator A3 and the comparison voltage VCOMP.

The voltage divider 235 may generate a second reference voltage VTHLD proportional to the first reference voltage VTREF. The voltage divider 235 may include a third resistor R3 and a fourth resistor R4. The second reference voltage VTHLD may be obtained using Equation 2:

$$VTHLD=VTREF*R4/(R3+R4). \quad (2)$$

The sampling signal generator 237 may include a fourth comparator A4 and a second logic circuit LC2, with the fourth comparator A4 comparing the ramp voltage VTIM with the second reference voltage VTHLD and outputting a comparison result to the second logic circuit LC2. The second logic circuit LC2 may generate the sampling signal VSH according to the comparison result.

When the third and fourth resistors R3 and R3 are set to have the same resistance, the sampling signal VSH may be generated for half-time sampling. At this time, the sensed voltage VCS is sampled and held at h1, which is the time halfway between the first time t1 and the second time t2 which are determined by the sampling signal VSH. Since the sampled sensed signal VCS_S corresponding to the result of sampling and holding the sensed signal VCS at the half time h1 is in proportion to the average of the inductor current IL1, an inductor average current can be obtained based on the sampled sensed signal VCS_S.

The timer circuit 23 may be implemented as an analog circuit, as shown in FIG. 7, but in other embodiments the timer circuit 23 may be implemented as a digital circuit including a counter. The timer circuit 23 may count the converter control signal VTon1 using a counter after generating the converter control signal VTon1, multiply a count value by a predetermined value (e.g., ½), and generate the sampling signal VSH based on the result of the multiplication.

Referring back to FIGS. 4 through 6, the controller 20 may operate the converter circuit 10-1 according to a switching frequency Fsw. The switching frequency Fsw may be 1/Ts. The controller 20 may adjust the switching frequency Fsw of the converter circuit 10-1 based on the inductor average current obtained as described above.

The switching frequency Fsw may be determined based on the input voltage VIN, the output voltage VOUT, and the output current IOUT in a COT converter. It is desirable to maintain the switching frequency Fsw as constant under various conditions in order to improve the performance of a converter. The controller 20 may just the switching frequency Fsw, thereby maintaining the switching frequency Fsw as constant even when the input voltage VIN, the output voltage VOUT, and the output current IOUT change.

Based on the inductor average current, the controller 20 may perform current sharing. For instance, when the inductor average current of the converter circuits 10-1, 10-2, and 10-3 differ from one another, the controller 20 may control the converter circuits 10-1, 10-2, and 10-3 to have the same inductor average current.

Figure 9:
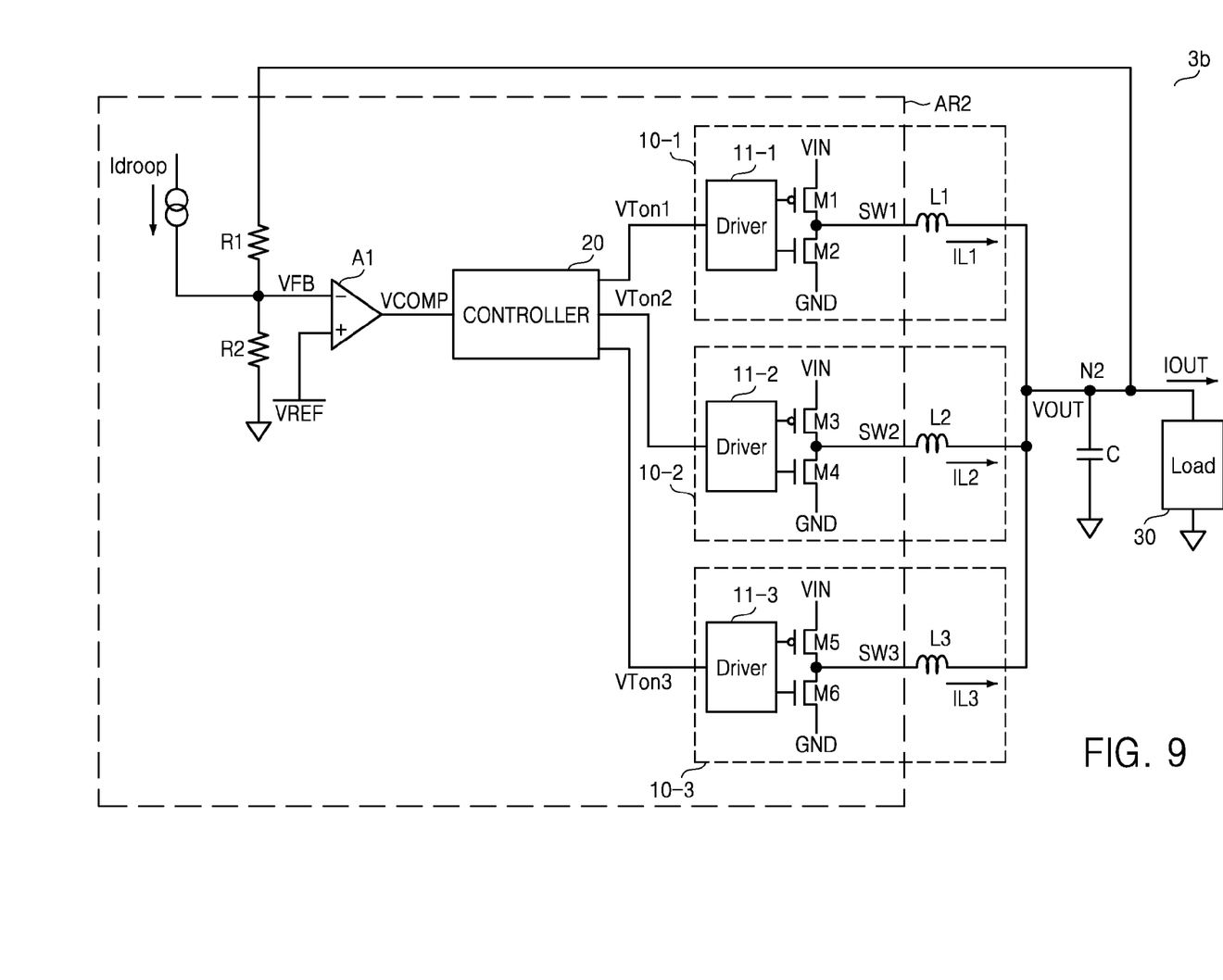
FIG. 9 is a circuit diagram of another exemplary DC-DC converter corresponding to FIG. 2.

FIG. 9 is a circuit diagram of another example 3b of the DC-DC converter 3 illustrated in FIG. 2. The structure of the DC-DC converter 3b illustrated in FIG. 9 is nearly the same as that of the DC-DC converter 3a illustrated in FIG. 3, and therefore, to avoid redundancy only the differences between them will be described in detail here.

Referring to FIG. 9, a droop current Idroop may be supplied to the inverting input terminal of the first comparator A1. When the output current IOUT is high in adaptive voltage positioning (AVP) or load-line control function, decreasing the output voltage VOUT may lead the decrease of power consumption and the increase of efficiency.

The controller 20 may control the output voltage VOUT by controlling the magnitude of the droop current Idroop according to the inductor average current. For instance, the controller 20 may decrease the output voltage VOUT by increasing the droop current Idroop in proportion to the inductor average current when the inductor average current increases.

A die area AR2 including droop current source, the controller 20, the feedback circuit 40, and the converter circuits 10-1, 10-2, and 10-3 (except for the inductors L1, L2, and L3) may be implemented on a silicon die.

Figure 10:
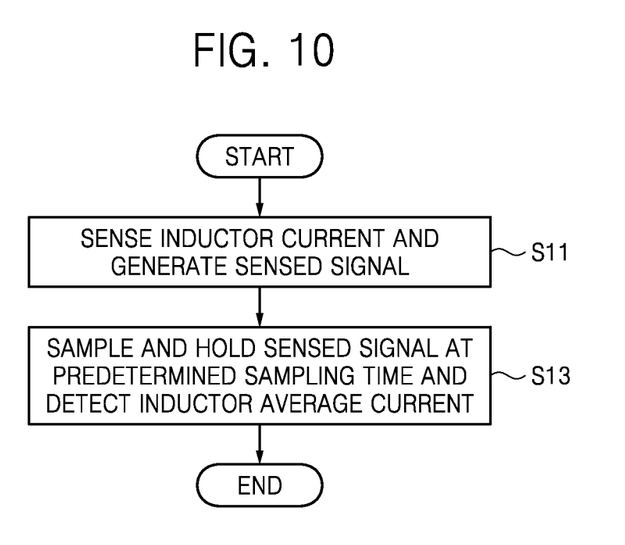
FIG. 10 is a flowchart of a method of operating a DC-DC converter according to some embodiments of the inventive concept.

FIG. 10 is a flowchart of a method of operating a DC-DC converter according to some embodiments of the inventive concept. Referring to FIGS. 4 and 10, the controller 20 may sense S11 the inductor current IL1 and generate the sensed signal VCS in operation S11. The controller 20 may sample and hold the sensed signal VCS at a predetermined sampling time and may detect an inductor average current in operation S13. The controller 20 may control the operation of the converter circuit 10-1 according to the inductor average current that has been detected.

Figure 11:
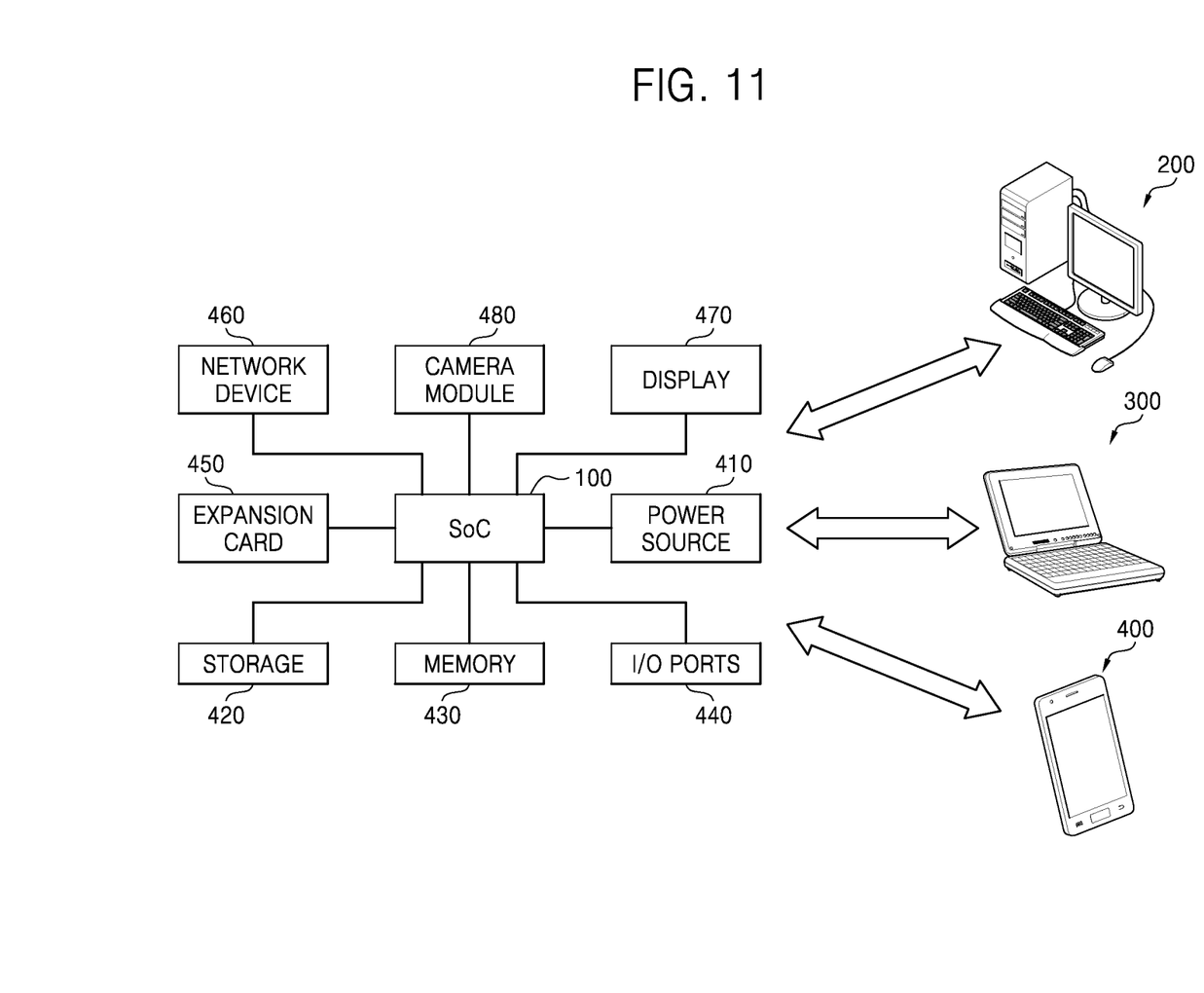
FIG. 11 is a block diagram of an electronic system including the SoC illustrated in FIG. 1 according to some embodiments of the inventive concept.

FIG. 11 is a block diagram of an electronic system including the SoC shown in FIG. 1 according to some embodiments of the inventive concept. Referring to FIG. 11, the electronic system may be implemented, for example, as a personal computer (PC) or a data server 200, a laptop computer 300, or a portable device 400.

The portable device 400 may be, for example, a cellular phone, a smart phone, a tablet personal computer (PC), a personal digital assistant (PDA), an enterprise digital assistant (EDA), a digital still camera, a digital video camera, a portable multimedia player (PMP), portable navigation device (PND), a handheld game console, or an e(electronic)-book device.

The electronic system 200, 300, or 400 includes the SoC 100, a power source 410, a storage device 420, a memory 430, I/O ports 440, an expansion card 450, a network device 460, and a display 470. The electronic system 200, 300 or 400 may further include a camera module 480.

The SoC 100 corresponds to the SoC 100 shown in FIG. 1. The SoC 100 may control the operation of at least one of the elements 410 through 480. The power source 410 may supply an operating voltage to at least one of the elements 100, and 420 through 480.

The storage device 420 may be implemented by a hard disk drive (HDD) or a solid state drive (SSD).

The memory 430 may correspond to the memory device 190 shown in FIG. 1 and may be implemented by a volatile or non-volatile memory. A memory controller (not shown) that controls a data access operation on the memory 430, e.g., a read operation, write operation (or program operation), or erase operation, may be integrated into or embedded in the SoC 100. Alternatively, the memory controller may be provided between the SoC 100 and the memory 430.

The I/O ports 440 may receive data transmitted to the electronic system 200, 300 or 400 or transmit data from the electronic system 200, 300 or 400 to an external device. For instance, the I/O ports 440 may include a port connecting with a pointing device such as a computer mouse, a port connecting with a printer, or a port connecting with a USB drive.

The expansion card 450 may be implemented as a secure digital (SD) card or a multimedia card (MMC). The expansion card 450 may be a subscriber identity module (SIM) card or a universal SIM (USIM) card.

The network device 460 enables the electronic system 200, 300 or 400 to be connected with a wired or wireless network. The display 470 displays data output from the storage device 420, the memory 430, the I/O ports 440, the expansion card 450, or the network device 460.

The camera module 480 converts optical images into electrical images. Accordingly, the electrical images output from the camera module 480 may be stored in the storage device 420, the memory 430, or the expansion card 450. Also, the electrical images output from the camera module 480 may be displayed through the display 470.

As described above, according to some embodiments of the inventive concept, a half-time sampling signal is generated using a simple circuit and an average current is sampled using the half-time sampling signal, so that accurate inductor average current information is obtained. As a result, a circuit area is reduced and accurate converter control becomes possible.

While the inventive concept has been particularly shown and described with reference to exemplary embodiments thereof, it will be understood by those of ordinary skill in the art that various changes in forms and details may be made therein without departing from the spirit and scope of the inventive concept as defined by the following claims.

What is claimed is:

1. A DC-DC converter comprising:
    at least one converter circuit including an inductor and configured to supply an output current to a load through the inductor; and
    a controller configured to sense inductor current flowing in the inductor to generate a sensed signal, to sample and hold the sensed signal for a predetermined sampling time to detect average current of the inductor, and to control operation of the at least one converter circuit based on the average current,
    wherein the sampling time is set to a time within a period during which the inductor current is less than peak current and greater than valley current.

2. The DC-DC converter of claim 1, wherein the controller operates the at least one converter circuit based on switching frequency and the switching frequency is determined based on input voltage of the DC-DC converter, an output voltage put across the load, and the output current.

3. The DC-DC converter of claim 1, wherein the at least one converter circuit comprises:
    a first buck converter circuit comprising a first inductor;
    a second buck converter circuit comprising a second inductor; and
    a third buck converter circuit comprising a third inductor, such that inductor currents flowing in the first through third inductors have a respective phase interval between one another of 120 degrees.

4. The DC-DC converter of claim 1, wherein the sampling time is substantially halfway between a first time at which the inductor current is at the valley current and a second time at which the inductor current is at the peak current.

5. The DC-DC converter of claim 1, wherein the controller comprises:
    a current sensor configured to sense the inductor current to generate the sensed signal;
    a timer circuit configured to generate a converter control signal for controlling the operation of the converter circuit and a sampling signal for sampling the sensed signal at the sampling time; and
    a sample-and-hold circuit configured to sample and hold the sensed signal based on the sampling signal.

6. The DC-DC converter of claim 5, wherein the timer circuit is implemented as a digital circuit comprising a counter.

7. The DC-DC converter of claim 5, wherein the timer circuit comprises:
    a converter control signal generator configured to compare ramp voltage with a first reference voltage and to generate the converter control signal;
    a voltage divider configured to generate a second reference voltage proportional to the first reference voltage; and
    a sampling signal generator configured to compare the ramp voltage with the second reference voltage and to generate the sampling signal.

8. The DC-DC converter of claim 1, wherein the controller adjusts switching frequency of the at least one converter circuit based on the average current of the inductor.

9. The DC-DC converter of claim 1, wherein the controller controls magnitude of droop current based on the average current of the inductor.

10. The DC-DC converter of claim 1, wherein the controller performs current sharing based on the average current of the inductor.

11. An electronic system comprising:
    a DC-DC converter configured to convert an input voltage into an output voltage; and
    an electronic device configured to operate based on the output voltage,
    wherein the DC-DC converter comprises:
        at least one converter circuit including an inductor and configured to supply an output current to the electronic device through the inductor; and
        a controller configured to sense inductor current flowing in the inductor and to generate a sensed signal, to sample and hold the sensed signal at a predetermined sampling time to detect average current of the inductor, and to control operation of the at least one converter circuit based on the average current,
    and wherein the sampling time is set to a time within a period in which the inductor current is less than peak current and greater than valley current.

12. The electronic system of claim 11, wherein the electronic system is a system-on-chip.

13. The electronic system of claim 11, wherein the controller operates the at least one converter circuit based on a switching frequency and the switching frequency is determined based on the input voltage, the output voltage, and the output current flowing in the electronic device.

14. The electronic system of claim 11, wherein the at least one converter circuit comprises:
    a first buck converter circuit comprising a first inductor;
    a second buck converter circuit comprising a second inductor; and
    a third buck converter circuit comprising a third inductor, such that wherein inductor currents flowing in the first through third inductors have a respective phase interval between one another of 120 degrees.

15. The electronic system of claim 11, wherein the sampling time is at half time between a first time at which the inductor current is at the valley current and a second time at which the inductor current is at the peak current.

16. A method of operating a DC-DC converter including at least one buck converter circuit which includes an inductor and supplies current to a load through the inductor, the method comprising:
   sensing the current and generating a sensed signal; and
   sampling and holding the sensed signal at a predetermined sampling time and detecting an average current of the inductor,
   wherein the current has a value between a peak current and a valley current at the sampling time.

17. The method of claim 16, including adjusting switching frequency of the at least one converter circuit based on the average current of the inductor.

18. The method of claim 16, including controlling magnitude of droop current based on the average current of the inductor.

19. The method of claim 16, including performing current sharing based on the average current of the inductor.

* * * * *